US006775829B1

(12) United States Patent
Kroening

(10) Patent No.: US 6,775,829 B1
(45) Date of Patent: *Aug. 10, 2004

(54) METHOD FOR CONFIGURING SOFTWARE FOR A BUILD TO ORDER SYSTEM

(75) Inventor: James L. Kroening, Dakota Dunes, SD (US)

(73) Assignee: Gateway, Inc., Poway, CA (US)

(*) Notice: Subject to any disclaimer, the term of this patent is extended or adjusted under 35 U.S.C. 154(b) by 519 days.

This patent is subject to a terminal disclaimer.

(21) Appl. No.: 09/631,081

(22) Filed: Aug. 2, 2000

Related U.S. Application Data

(63) Continuation-in-part of application No. 09/562,870, filed on May 1, 2000, now abandoned, which is a continuation of application No. 09/090,118, filed on Jun. 4, 1998, now Pat. No. 6,080,207, application No. 09/631,081, which is a continuation-in-part of application No. PCT/US99/08095, filed on Apr. 13, 1999.

(51) Int. Cl.$^7$ ............................. G06F 9/44; G06F 9/445
(52) U.S. Cl. .................... 717/175; 717/177; 717/174; 717/172; 717/168; 717/178; 717/120; 717/121
(58) Field of Search .................................. 717/175, 172, 717/174, 177, 164, 168, 178, 120, 121

(56) References Cited

U.S. PATENT DOCUMENTS

| | | | | |
|---|---|---|---|---|
| 5,008,814 A | * | 4/1991 | Mathur | 709/221 |
| 5,666,501 A | * | 9/1997 | Jones et al. | 345/748 |
| 5,668,992 A | * | 9/1997 | Hammer et al. | 713/1 |
| 5,675,748 A | * | 10/1997 | Ross | 710/104 |
| 5,835,777 A | * | 11/1998 | Staelin | 717/175 |
| 5,842,024 A | * | 11/1998 | Choye et al. | 717/178 |
| 5,894,571 A | | 4/1999 | O'Connor | 713/2 |
| 5,960,411 A | * | 9/1999 | Hartman et al. | 705/26 |

(List continued on next page.)

OTHER PUBLICATIONS

Chan et al., "Software Configuration Management Tools", Proceedings of the 8th IEEE International Workshop on Software Technology and Engineering Practices, Jul. 1997, pp. 238–250.*

Schwille, J., "Modeling Product and Process Characteristics in Software Configuration Management", 1st Euromicro Conferenc on Software Maintenance and Reegineering, Mar. 1997, pp. 25–32.*

Capretz et al., "COMFORM–A Software Maintenance Method Based on the Software Configuration Management Discipline", Proceedings of the Conference on Software Maintenance, Nov. 1992, pp. 183–192.*

Primary Examiner—Wilbert L. Starks, Jr.
Assistant Examiner—Kelvin Booker
(74) Attorney, Agent, or Firm—Scott Richardson; Kevin E. West; Suiter West PC LLO

(57) ABSTRACT

The present invention is directed to a method of building a custom software configuration, which may include receiving a first customer order for a first information handling system and a second customer order for a second information handling system. The first customer order including a first list of hardware configuration components and a first list of software configuration components and the second customer order including second list of hardware configuration components and a second list of software configuration components. At least one of the first list of hardware configuration components is different from the second list of hardware configuration components and the first list of software configuration components is different from the second list of software configuration components. At least one software configuration is stored on a removable medium, the at least one software configuration suitable for loading at least one of the first list of software configuration components and the second list of software configuration components onto at least one of the first information handling system and the second information handling system.

23 Claims, 9 Drawing Sheets

U.S. PATENT DOCUMENTS

| | | | |
|---|---|---|---|
| 5,963,743 A | 10/1999 | Amberg et al. | 717/174 |
| 5,978,590 A * | 11/1999 | Imai et al. | 717/177 |
| 5,991,543 A | 11/1999 | Amberg et al. | 717/175 |
| 5,995,757 A | 11/1999 | Amberg et al. | 717/175 |
| 6,080,207 A * | 6/2000 | Kroening et al. | 717/172 |
| 6,178,546 B1 * | 1/2001 | McIntyre | 717/115 |
| 6,182,275 B1 * | 1/2001 | Beelitz et al. | 717/175 |
| 6,236,901 B1 * | 5/2001 | Goss | 700/95 |
| 6,282,711 B1 * | 8/2001 | Halpern et al. | 717/175 |
| 6,301,707 B1 * | 10/2001 | Carroll et al. | 717/177 |
| 6,389,592 B1 * | 5/2002 | Ayres et al. | 717/172 |
| 6,493,871 B1 * | 12/2002 | McGuire et al. | 717/173 |

* cited by examiner

METHOD FOR CONFIGURING SOFTWARE FOR A BUILD TO ORDER SYSTEM

CROSS REFERENCE TO RELATED APPLICATION

The present application is a Continuation-In-Part of U.S. patent application Ser. No. 09/562,870 filed May 1, 2000 (now abandoned), which is a Continuation of U.S. patent application Ser. No. 09/090,118 filed Jun. 4, 1998, now U.S. Pat. No. 6,080,207 issued Jun. 27, 2000.

The present application is also a Continuation-In-Part of International Patent Application Serial Number PCT/US99/08095, international filing date Apr. 13, 1999, pending. Said U.S. patent application Ser. No. 09/090,118, Patent Cooperation Treaty Application PCT/US99/08095 and U.S. patent application Ser. No. 09/562,870 are herein incorporated by reference in their entirety. The following patent applications are also incorporated by reference in their entirety:

Serial Number Filing Date
09/631,641 Aug. 2, 2000
09/631,088 Aug. 2, 2000
09/630,404 Aug. 2, 2000
09/631,085 Aug. 2, 2000

FIELD OF THE INVENTION

The present invention relates generally to information handling systems and, in particular, to a system and method of creating and delivering software to the information handling systems.

BACKGROUND OF THE INVENTION

When information handling systems, such as personal computers and the like, are mass-produced, a manufacturer may take advantage of a common software configuration when loading software onto the hard drives. For example, a computer system is set up as a model system having the desired software configuration that is to be duplicated in other personal computers. Once the model system has been set up, a digital image of the hard drive is created. The digital image is essentially a "picture" of the hard drive. Creating a digital image of the hard drive is well known to those skilled in the art. Once this image is created, it is distributed to the other hard drives requiring the same configuration. The result is that all of the computer systems receiving a copy of the image during their manufacturing and assembly process will have the same hard drive content as the model system.

For software upgrades on existing computer systems, an image is created for a set of changes to be made to the hard drive and the set of changes are then transferred to the computer systems. This results in quicker computer upgrades, which in turn provides a cost savings, particularly when a large number of computer systems are to be upgraded.

Nonetheless, a disadvantage of this approach is that it requires a model system first be set up utilizing the same operating system and the same set of applications as desired on the other computer systems. To set up the model system, the software must be physically loaded from a disk onto the model computer system before the image can be created for transferring to the other computers.

Even if a group of computers are networked together, a baseline configuration must also be established on the file server which requires that the file server physically be set up with the desired software configuration from a disk. The file server then allows the networked computers to have access to the new configuration. Networking prevents a system administrator from having to install software upgrades individually on each computer system. However, the upgrade must first be made to the file server which requires installation via a disk.

Additionally, in the past, information handling systems, such as desk-top computer systems, laptops, personal digital assistants, digital information appliances, and the like, were sold with little or no software. Therefore, the tasks of obtaining, installing and configuring software were left to the purchaser. However, in the ever increasingly competitive environment of the manufacture and sale of information handling systems, manufacturers generally provide hardware and software in a combined system that preferably, is usable out of the box. Further complicating this process is "build to order" computer systems. In build to order information handling systems, the customer may be given a wide selection of software from which to choose. The complexity and sheer number of choices result in essentially a custom configuration, the complexity of which is greatly increased with each choice or option given to the consumer.

One method utilized to address this problem involved extracting a hard drive from the assembly process, connecting the hard drive to a computer for the purpose of programming the drive, programming the drive, disconnecting the drive from the computer and returning the programmed hard drive to the computer assembly process for installation on a computer. However, this method is time consuming and, therefore costly. Furthermore, disconnection and reconnection of the programmed hard drive may corrupt the software programmed onto the drive.

An additional method utilized to address this problem involved loading the hard drive from a network after the computer hardware is assembled. However, this method results in high traffic on the network. In a large-volume manufacturing environment, this high traffic greatly reduces the throughput of the network. In essence, the greater the number of systems to be manufactured, the greater the requirement of network throughput. Furthermore, a network failure may interrupt and even cripple the entire manufacturing line.

Another method utilized to address this problem involved a parallel manufacture of a custom hardware configuration and software configuration. Hardware was built and software was written to a CD-ROM. The hardware system was then booted and software loaded to the system from the CD-ROM, after which the system was tested. However, this requires selective installation on the CD-ROM from a comprehensive software library located elsewhere on a network. Thus, the requirement of network resources and throughput limits are encountered again. Additionally, the use of that CD-ROM is limited to the computer system for which the CD-ROM was configured. Thus, a great number of CD-ROMs had to be created for each new configuration desired.

Therefore, it would be desirable to provide an improved method for configuring software for a build to order system.

SUMMARY OF THE INVENTION

Accordingly, the present invention is directed to a method for configuring software for a build to order system. In a first aspect of the present invention, a method of building a custom software configuration includes receiving a plurality of requests for desired software configurations. At least one baseline configuration is identified corresponding to the desired software configuration. At least one baseline configuration is then compared with the desired software configuration. A set of changes are then created based on the comparison, wherein the set of changes are suitable for combining with the baseline configuration to generate the desired software configuration. At least one baseline configuration and set of changes are stored on a removable medium, the removable medium suitable for loading a plurality of desired software configurations corresponding to the requested plurality of desired software configurations.

In a second aspect of the present invention, a method of building a custom software configuration includes receiving a first request for a first desired software configuration and a second request for a second desired software configuration. The first desired software configuration being different than the second desired software configuration. At least one software configuration corresponding to at least one of the first desired software configuration and the second desired software configuration is identified. Wherein, at least one software configuration is suitable for generating the first desired software configuration and the second desired software configuration. The software configuration is then stored on a removable medium, the removable medium suitable for loading the first desired software configuration and the second desired software configuration.

In a third aspect of the present invention, a method of building a custom software configuration includes receiving a first request for a first desired software configuration and a second request for a second desired software configuration, the first desired software configuration being different than the second desired software configuration. At least one baseline configuration corresponding to at least one of the first desired software configuration and the second desired software configuration is identified. The at least one baseline configuration is compared with the first desired software configuration and the second desired software configuration. A set of changes are created based on the comparison wherein the set of changes are suitable for combining with the at least one baseline configuration to generate the first desired software configuration and the second desired software configuration. The at least one baseline configuration and set of changes are stored on a removable medium, the removable medium suitable for loading the first desired software configuration and the second desired software configuration.

In a fourth aspect of the present invention, a method of building a custom software configuration includes receiving a first customer order for a first information handling system and a second customer order for a second information handling system. The first customer order including a first list of hardware configuration components and a first list of software configuration components and the second customer order including second list of hardware configuration components and a second list of software configuration components. At least one of the first list of hardware configuration components is different from the second list of hardware configuration components and the first list of software configuration components is different from the second list of software configuration components. At least one software configuration is stored on a removable medium, the at least one software configuration suitable for loading at least one of the first list of software configuration components and the second list of software configuration components onto at least one of the first information handling system and the second information handling system.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the scope of the present inventions. The following detailed description is, therefore, not to be taken in a limiting sense.

Referring generally now to FIGS. 1 through 7, exemplary embodiments of the present invention are shown. An information handling system may include a typical computer system, such as a desktop or laptop computer, personal digital assistant, digital information appliance, internet appliance, and the like. A removable medium is a medium readable by an information appliance and which is suitable for storing instructions and data, such as a compact disk read-only-memory (CD-ROM), digital versatile disc (DVD), PC Card for utilization in a PC slot, floppy disk, floppy/optical disk for use in a floppy/optical drive, zip disk for use in a zip drive, tape for use in a tape drive, and the like as contemplated by a person of ordinary skill in the art.

Figure 1:
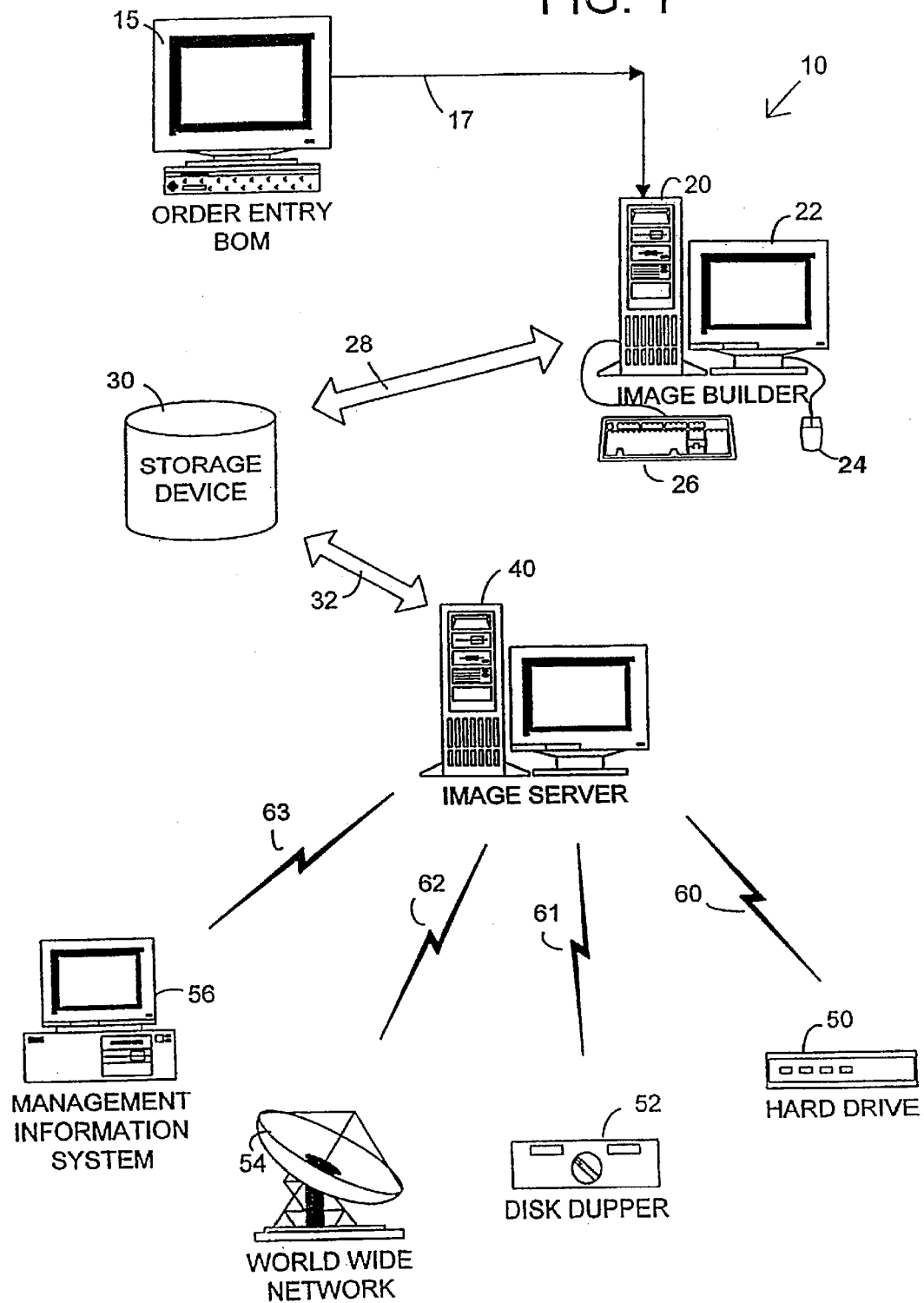
FIG. 1 is an exemplary embodiment of the present invention wherein a disk image is created for a desired configuration.

Referring now to FIG. 1, an exemplary embodiment of the present invention is shown wherein a disk image is created for a desired configuration. The disk image process utilizes a computerized network system 10 for creating and delivering custom software configurations defined by purchasing customers. The disk image process utilizes intelligence and granularity in generating the desired software configuration. Included within the computerized network system 10 is an image builder 20 that creates a disk image of the desired software configuration and then transfers that image to a storage device 30. The storage device 30 is connected to an image server 40 that performs the task of delivering the image. The image may be delivered directly to a hard drive 50 during a manufacturing and assembly process of a computer system. The image may also be delivered to a disk dupper 52 for duplicating the image on a removable medium that is readable by an information handling system, a ground based transmitter 54 for broadcasting the image, or to a management information system (MIS) 56.

The first step in the exemplary disk image delivery process involves entering a customer's order into an order entry system 15 to establish a bill of materials (BOM). The bill of materials includes a customer's selection of a desired software configuration for a particular computing system. Included within the bill of materials are hardware parameters of the computing system to be receiving the software configuration, including BIOS and CMOS settings plus other pertinent information as may be necessary, such as operating systems, drivers, utilities, application software, vendor software, and the like. A software configuration may also include the hardware settings, drivers, user-selected software, and the like as contemplated by a person of ordinary skill in the art. This information may be used by the image builder to create a digital image of the desired software configuration.

In one embodiment, the order entry system 15 is a minicomputer. A minicomputer is a multi-processing system capable of supporting from four to about two hundred users simultaneously. Minicomputers are well known to those skilled in the art. For example, an IBM AS/400 minicomputer functions as the order entry system 15 in one embodiment. In terms of size and power, a minicomputer falls between a workstation and a mainframe. Equivalent inputting methods are acceptable as an alternative to using a minicomputer, such as the use of a workstation, mainframe or other information handling system as contemplated by a person of ordinary skill in the art.

Information included within the bill of materials corresponds to the particular software configuration desired by a customer, plus specifics on the computing system receiving the software configuration. A desired configuration may be an upgrade to an application already installed on the computing system or the configuration may be a new hard drive that is to be configured with an operating system and a variety of applications. Specifics on the computing system include, but are not limited to the following parameters, hard drive size, installed accessories, current software configuration, BIOS and CMOS settings. Information corresponding to the bill of materials as generated by the order entry system is applied to the image builder over interface 17. Interface standards between a minicomputer and an image builder 20 are well known in the art.

Figure 2:
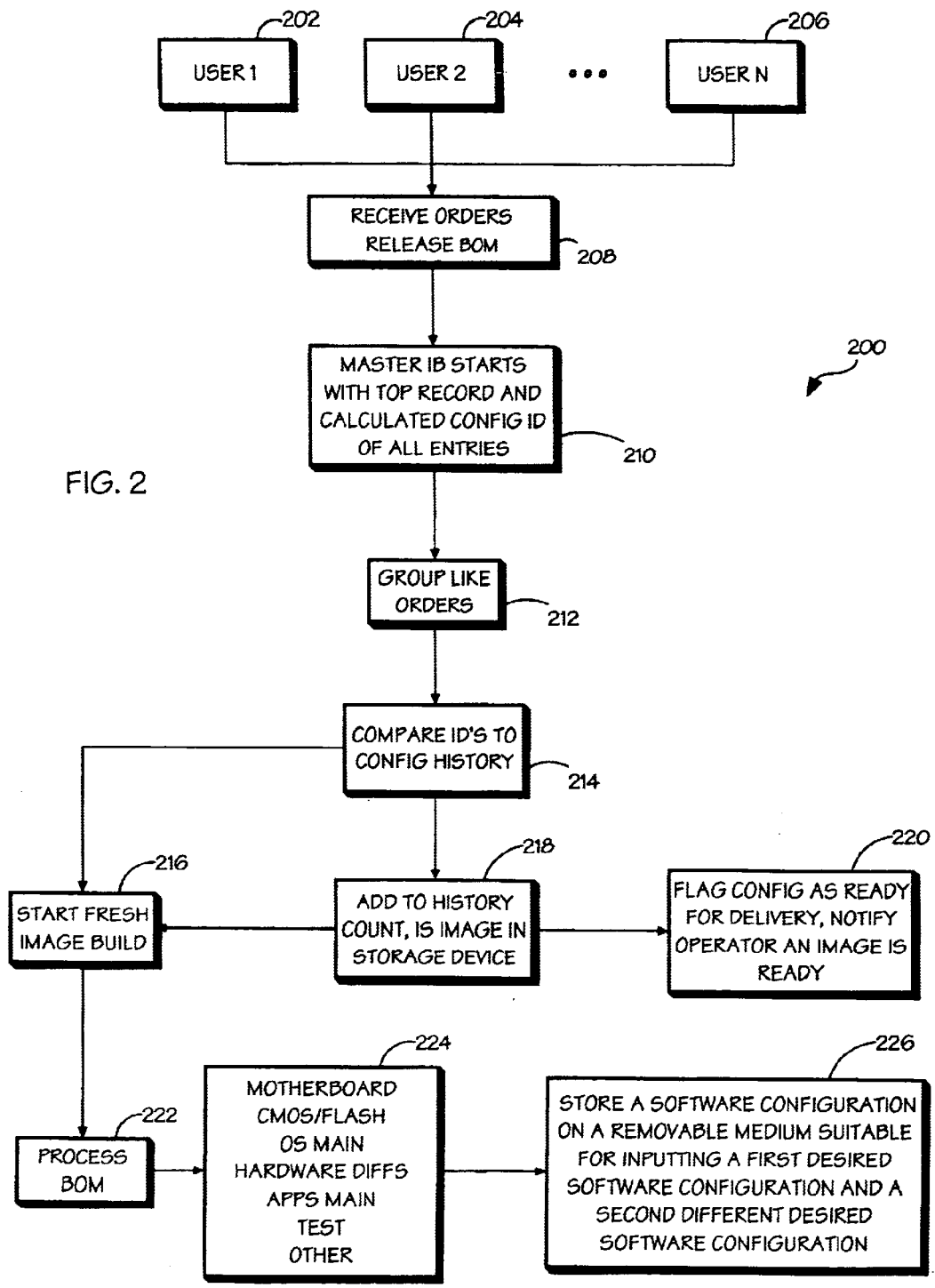
FIG. 2 is a flow diagram of an exemplary embodiment of the present invention wherein a logic flow for creating a disk image of a desired software configuration is shown.

In referring to FIG. 2, an exemplary embodiment 200 is shown wherein a logic flow for creating a disk image of a desired software configuration is illustrated. A plurality of users 202, 204 and 206 enter orders for a first information handling system, a second information handling system and up to an "Nth" information handling system. The first information handling system is different from the second information handling system. For example, the first information handling system may include a different hardware component requiring a different driver, software component, and the like. These orders are received and a Bill of Materials (BOM) is generated 208.

Receipt of the bill of materials is represented by block 210. The image builder 20 starts with the top record and calculates a configuration identification (ConFig ID) of all the entries. In block 212, the image builder 20 groups like orders together. Grouping like orders together allows for increased efficiency due to the commonality between orders.

In block 214, the image builder 20 compares the configuration IDs to the configuration history. If the configuration ID corresponds to a previously configured image, then the image builder 20 looks at whether the image is in a storage device 30, as illustrated in FIG. 1. If the image 218 is found in the storage device 30, then block 220 flags the configuration as ready for delivery and notifies an operator of the computerized network 10 that a desired image is ready. Otherwise, if the image is not found in the storage device 30, the image is created by the image builder 20 according to block 216 as a fresh build. As part of the fresh build process, block 222 requires the image builder 20 to process the bill of materials to determine the parameters for building an image according to the desired software configuration and ensure that they are compatible with the customer's hardware, software and special requirements 224. The final result or output from block 222 is an image or "digital picture" of the desired software configuration according to the bill of materials.

An additional image, or image suitable for loading two or more different software configurations, may also be stored on a removable medium to load a software configuration on an information handling system 226. An image of the desired software configuration may be utilized to supply the desired software configuration to more than one information handling system even though the first information handling system is different from the second information handling system. For instance, the same baseline configuration may be utilized with different delta images stored on a removable medium, the removable medium suitable for inputting the software configuration on the first information handling system and the second information handling system. Further, the baseline configuration with sufficient delta images may be used to supply software configurations to N number of devices. It may be preferable to identify the loaded software configuration on the configuration ID of the desired information handling system. Thus, the same removable medium may be utilized on more than one information handling system configuration. For example, the configuration ID may be utilized to determine which delta images to include with a baseline image to arrive at the desired image for loading to the information handling system.

Referring again to FIG. 1, an exemplary embodiment is shown wherein the removable medium includes a baseline image and delta images. The image builder 20 is coupled to the order entry system 15 via interface 17 for receiving the bill of materials which provides pertinent information for creating or building an image of the desired software configuration. Intelligence is provided in this step of the image delivery process because the image builder 20 sorts through a database of stored images to first determine if an image of the desired configuration has already been created for a prior computer configuration. These images are stored on a large capacity storage device 30 or multiple storage devices. If the image of the desired configuration has not previously been created, the image builder 20 selects an appropriate baseline image from the storage device 30 and then determines which incremental images are to be layered on top of the baseline image to achieve the desired final configuration.

These incremental images, which are also referred to as delta images, only contain additional information beyond the baseline image for achieving the desired software configuration. A level of granularity is thus achieved because of the linear flow process associated with achieving the desired configuration by adding a delta image to a baseline image. If the delta image is not in the data base, then the image builder constructs the appropriate delta image. Configuration numbers are assigned to all baseline images and delta images, which help the image builder 20 sort through all the possible images that can be used in the configuration process.

The actual steps that must be undertaken to create a digital image of a computing system's hard drive are well known to one skilled in the art. The image builder 20 looks at the data stream to be loaded on the computing system's hard drive 50. Since the disk image delivery process illustrated in FIG. 1 may be a linear process, the image builder 20 goes through the baseline image file by file and identifies those areas that are different and determines what parts are to be replaced. File names are examined not only by their name but by their creation date. The image builder 20 looks at specific files by a specific name or code at the time of its creation.

In lieu of examining the baseline on a file by file basis, a bit by bit comparison may be performed. In addition to the image builder 20 performing this comparison task, another level of intelligence is obtained when the image builder 20 determines changes to be made in registry settings and in interrupt settings so that the new software configuration will operate properly on the computing system. If the desired software configuration is not compatible with the hardware of the computing system, then the image builder rejects the bill of materials as a non-functional configuration.

Either the entire image (baseline and delta) or just the delta image may be loaded onto a computing system (not shown). If the computing system's hard drive, such as the one depicted in FIG. 1, is currently configured and all that is needed is an application upgrade, then only the delta image is created and installed. However, if a new hard drive 50 is being configured, as in a manufacturing and assembly process, then the entire image is installed on the hard drive 50.

The image delivery process avoids having to create a new baseline for every image that is to be delivered. Furthermore, the image builder 20 contains editors that determine, for example, proper registry settings and also add directory information corresponding to installed applications and their file locations. An added benefit of layering information on top of a baseline is that it allows technical support personnel and software engineers to isolate problem areas and debug and correct problems as they arise. Because of the granularity, if a problem arises after a delta configuration was overlaid on top of baseline image, and that image is known to be error free, then it is easy to isolate the problem to the newly added delta configuration. Once another delta image is created with the fix, then the correct image is installed on the computing systems having the known error.

The image builder 20 may include an information handling system, such as a computer having a processor, random-access memory (RAM), read-only memory (ROM), and one or more storage devices, such as a hard disk drive, a floppy disk drive, an optical disk drive, a tape cartridge drive, and the like. The memory, hard drives, floppy disks, and the like are types of computer-readable media. The image builder 20 may be coupled to a monitor 22, a pointing device 24 and a keyboard 26. The image builder is not limited to any particular type of computer. In one embodiment, the image builder 20 is a PC-compatible computer running a version of the Microsoft Windows operating system. The construction and operation of such computers are well known within the art.

The monitor 22 permits the display of information for viewing by a user of the computer. The invention is not limited to any particular monitor 22. Such monitors include cathode ray tube (CRT) displays, as well as flat panel displays such as liquid crystal displays (LCD's). The pointing device 24 permits the control of the screen pointer provided by the graphical user interface of operating systems such as versions of Microsoft Windows. The invention is not limited to any particular pointing device 24. Such pointing devices include mousses, touch pads, trackballs, and point sticks. Finally, the keyboard 26 permits entry of textual information into the image builder 20, as known within the art, and the image builder 20 is not limited to any particular type of keyboard.

The image builder 20 may be coupled to a large volume storage device 30 via interface 28. Once the image builder 20 defines an image and assigns a corresponding configuration number, the images may be stored on the storage device 30. Likewise, when the image builder 20 is creating a disk image, the storage device 30 is first surveyed to find the desired configuration or a close match to the desired configuration for establishing a baseline to build upon. The storage device 30 is not limited to any specific format or structure as long as the storage device 30 comprises a computer-readable media for interfacing. The storage device 30 may be a family of hard disk drives, a floppy disk drive (into which a floppy disk can be inserted), an optical disk drive, or a tape cartridge drive. The implemented storage device 30 may be internal to the image builder 20 or may exist as a stand lone entity, as illustrated in FIG. 1.

After the image builder 20 has created an image of the desired software configuration the image is passed from the storage device 30 to an image server 40 via interface 32. The image server 30 is another computer system similar to the image builder 20. The image server 30 is the point of delivery for the disk image. The image server 30 may have a variety of interfaces as illustrated in FIG. 1. One illustrative embodiment has the image server coupled to a hard drive 50 via interface 60. This embodiment allows the hard drive 50 to be configured with an image of the desired software configuration before installation into a computer system. Another illustrative embodiment has the image server 30 coupled to a disk dupper 52 via interface 61. The disk dupper 52 duplicates the disk image on a computer readable medium, such as a floppy disk, a recordable CD, or a zip drive. Other means of copying the disk image are acceptable.

In still another illustrative embodiment, the image server 40 is coupled to a ground-based transmitter 54 via interface 62 for wireless transmission of the disk image to an end user. Depending on the transmitter's 54 operating parameters and the transmitter's relay capabilities, the image could be transmitted anywhere in the world. In lieu of the ground based transmitter 54, the image server 40 is connected to the Internet in any particular manner, by which the invention is not limited to and which is not shown in FIG. 1. Internet connectivity is well known within the art.

In one embodiment, the image server 40 includes a modem and corresponding communication drivers to connect to the Internet via what is known in the art as a "dial-up connection." In another embodiment, the image server 40 includes an Ethernet or similar hardware card to connect to a local-area network (LAN) that itself is connected to the Internet via what is known in the art as a "direct connection" (e.g., T1 line, etc.). In further embodiments, the image server 40 may be connected to the Internet using a cable modem or satellite Internet connectivity (as illustrated by transmitter 54).

In yet another illustrative embodiment, the image server 40 is coupled to a management information system (MIS) 56 via interface 63. Management Information Systems may be used to support the infrastructure of businesses and organizations wherein such systems are well known to one skilled in the art.

Referring now to FIGS. 3A, 3B, 3C and 3D, exemplary embodiments of the present invention are shown wherein a plurality of users choose from a plurality of customizable options for a product. For instance, the consumer, accessing a receiver over a network connection, may select from a plurality of options to configure a desired product, such as an information handling system. The user may utilize data entry screens, such as the examples shown in FIGS. 3A and 3B, to select from a variety of option choices to enter the data into the receiver. By offering a variety of options, a corresponding variety of software configurations must also be offered, such as drivers, hardware setting, desired operational software, and the like.

Figure 3A:
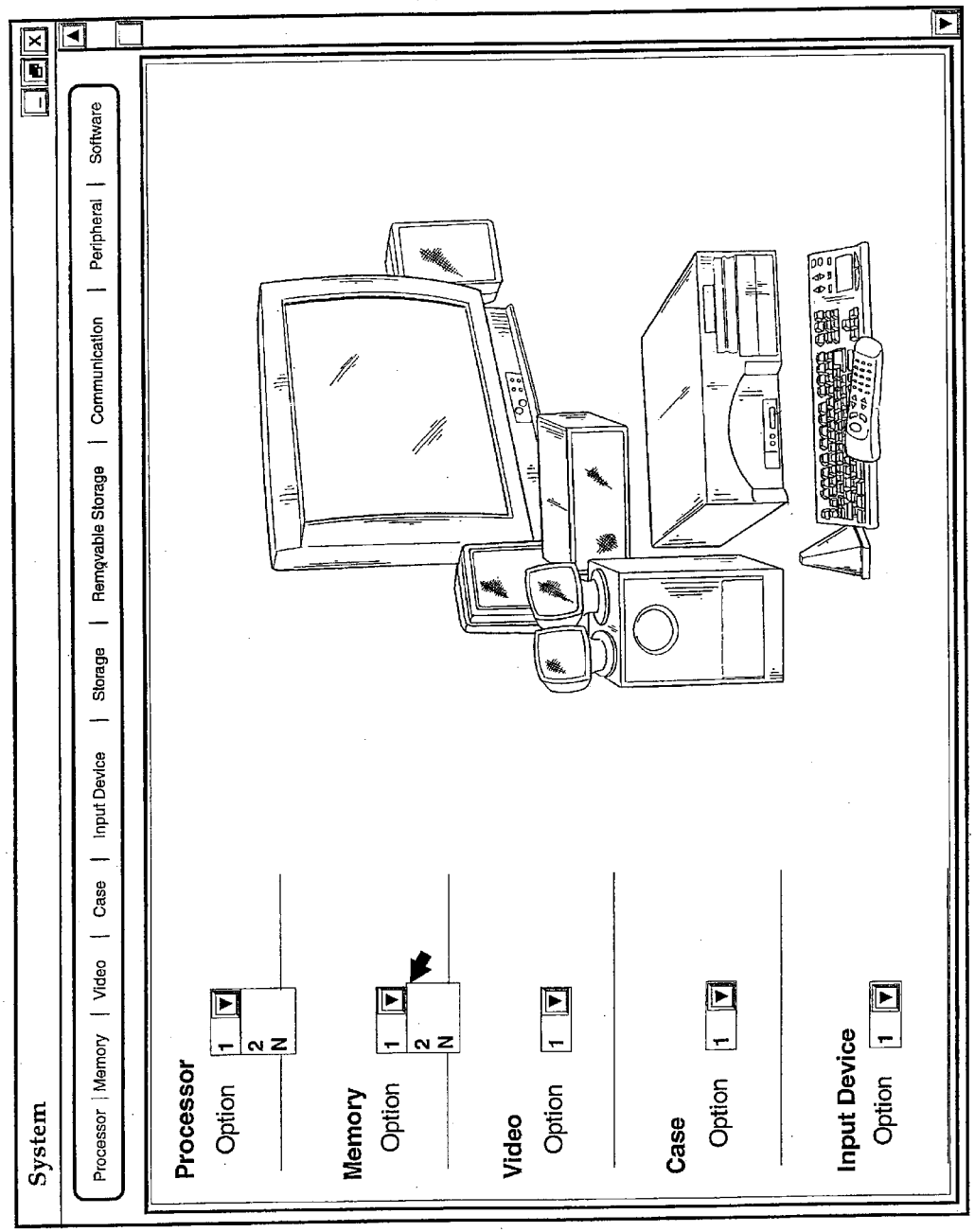
FIGS. 3A, 3B, 3C and 3D are illustrations of exemplary embodiments of the present invention wherein a plurality of users choose from a plurality of customizable options for a product.
Figure 3B:
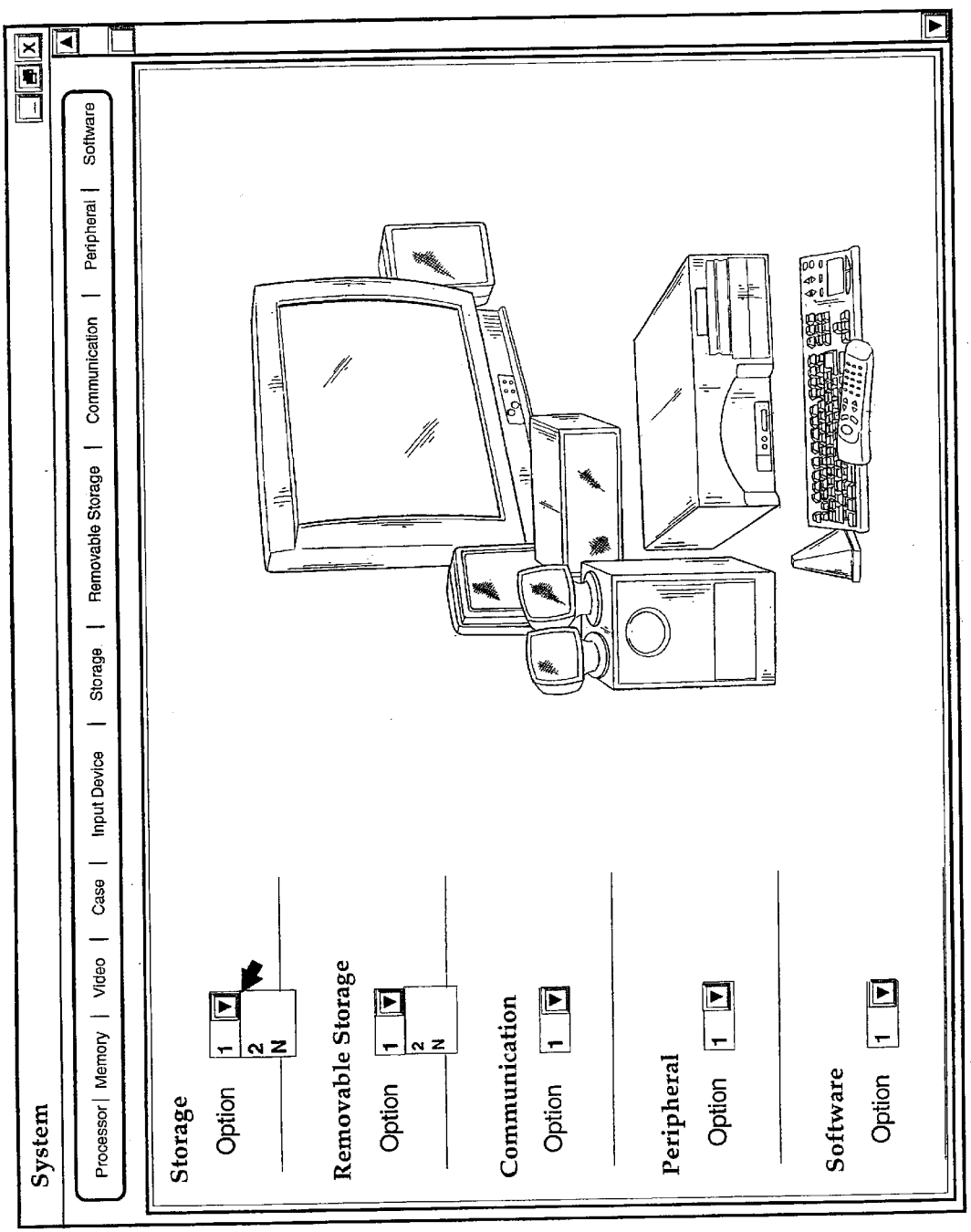
Figure 3C:
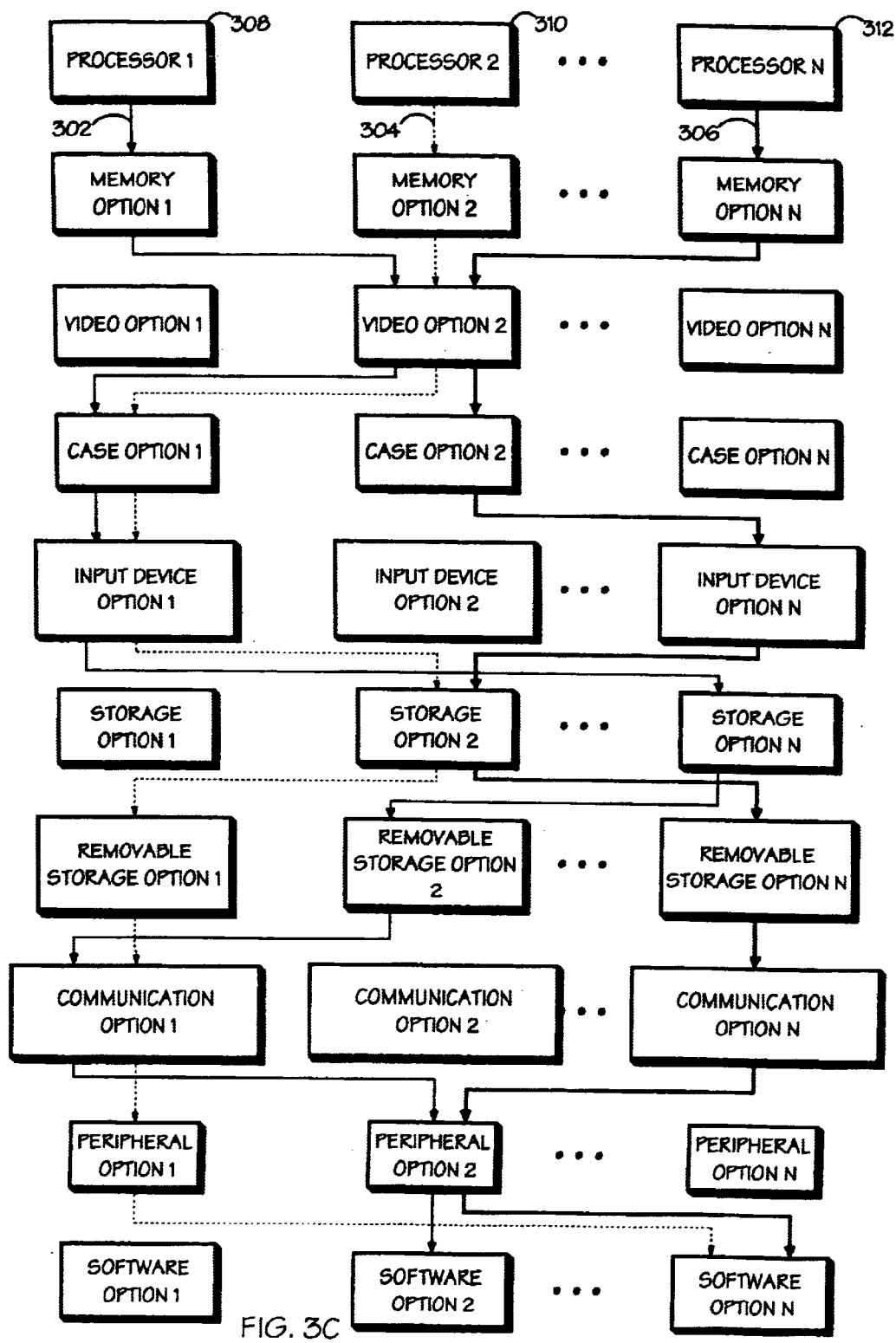

For example, in an exemplary embodiment 300 of the present invention as shown in FIG. 3C, a first consumer as denoted by a light weight line 302, a second consumer as denoted by a dashed line 304, and a third user as denoted by a heavy weight line 306, may select from different processor options 308, 310 and 312 from a plurality of processors. Thus, as the first consumer 302 selects between memory, video, case, input device, storage, removable storage, communication, peripheral, software, and the like, these choices are input to the receiver. A second consumer 304 also choosing from the variety of choices, such as processor, memory, video, case, input device, storage, removable storage, communication, peripheral, software, and the like, inputs this information into the receiver. Similarly, the third consumer 306 also chooses from the variety of choices, such as processor, memory, video, case, input device, storage, removable storage, communication, peripheral, software, and the like also has the choices input into the receiver. As is readily apparent, providing a wide variety of choices has the necessary consequence of increased overhead and production time as these options are incorporated into the desired product. Additionally, the software, either as an option itself or as the corresponding operational software for the desired devices further complicates the process. For example, a separate CD-ROM corresponding to only one particular information handing system would result in further complications in the manufacturing process. However, by utilizing the present invention, a removable medium may be utilized on a plurality of systems by including the necessary software configurations, thereby greatly simplifying the manufacturing process.

Figure 3D:
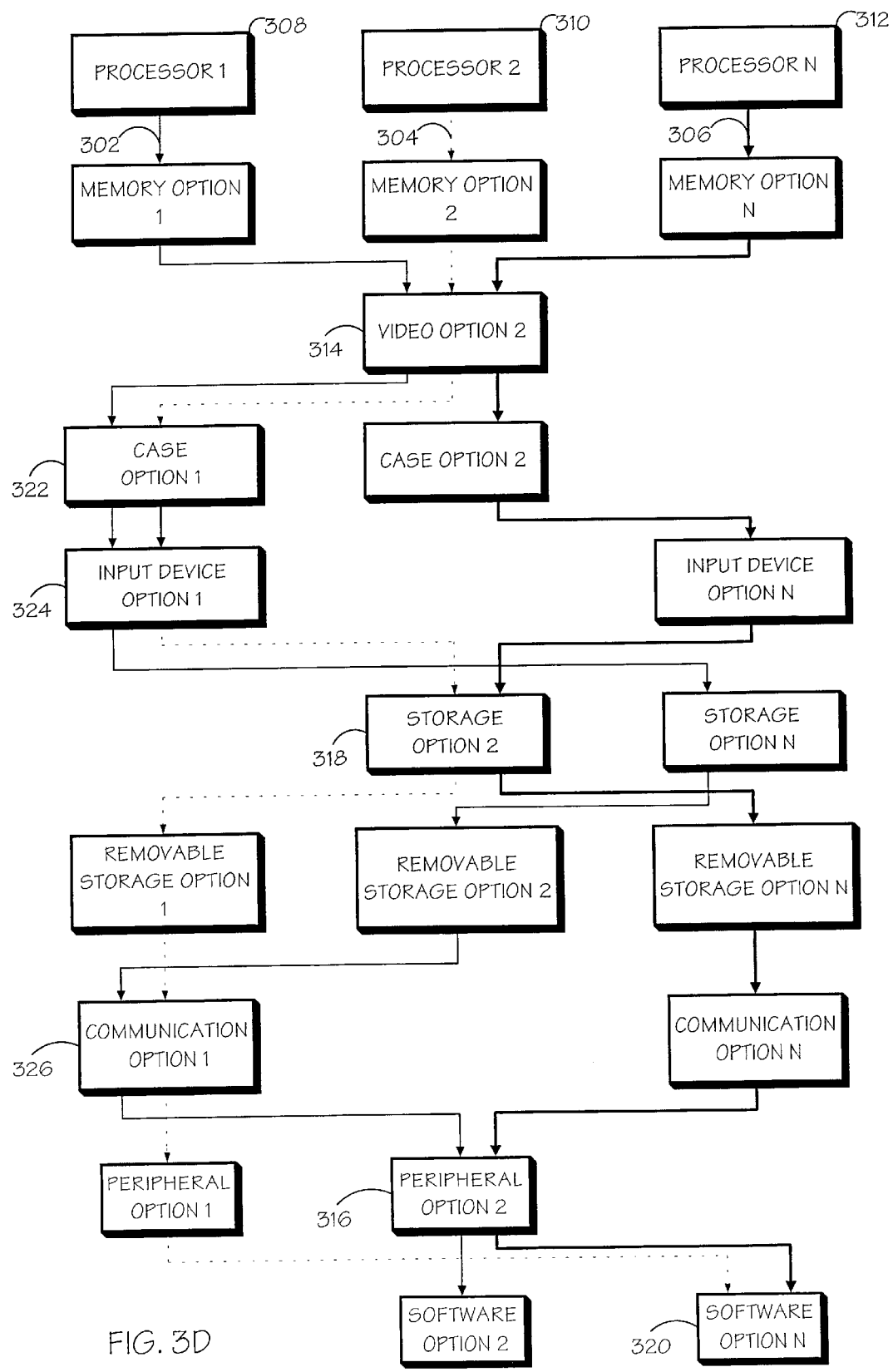

Referring now to FIG. 3D, an exemplary embodiment of the present invention, as shown in FIG. 3C, is illustrated wherein consumer selections from a variety of options are shown. A plurality of consumers selecting from a variety of options may select similar options. For example, a first consumer 302 may select certain options similar to the options chosen by a third consumer 306, such as video option two 314 and peripheral option two 316. Additionally, a second consumer 304 may select options in common with the third consumer 306, such as video option two 314, storage option two 316, and software option "n" 320. Similarly, the first consumer may select options in common with the second consumer 306, such as video option two 314, case option one 322, input device option one 324, and communication option one 326. Thus, the first consumer 302 and the second consumer 304 have the most choices in common. Grouping the first consumer 302 and the second consumer 304 together may increase the efficiency of the assembly process by installing the similar software components. It may also be preferable to further extend the grouping as the similarities continue to further increase the efficiency of the process. For instance, product one chosen by consumer one may be produced first and the next most similar product, chosen by consumer two, next, followed again by the product most similar to product two, in this example chosen by consumer three. This hierarchical ordering based on similarity of options chosen may allow the products to be produced in an improved and more efficient manner. Thus, by utilizing the present invention, these similar information handling systems utilizing similar baseline images and different delta images may utilize the same removable medium, such as a CD-ROM, to install the necessary software corresponding to the hardware and software options chosen. Thus, even in situations where the entire software library is not stored on a single removable medium, the numbers of removable mediums needed may be greatly reduced. For example, by grouping orders together, such as by product one and product two that may share the same removable medium having the same baseline image an different delta images, same delta images and different baseline images, and the like. In this way, a fewer number of removable mediums are produced.

Figure 4:
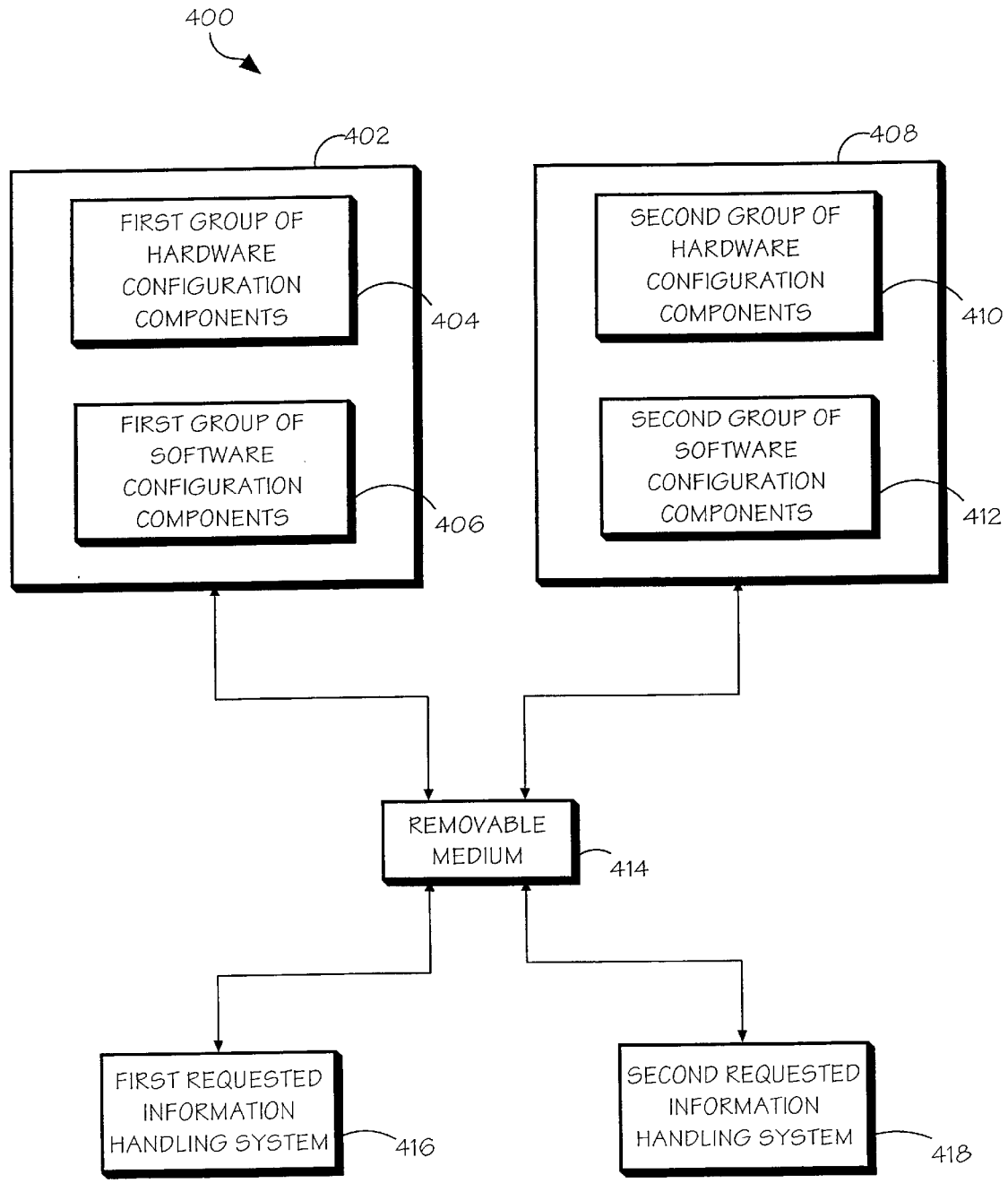
FIG. 4 is a block diagram of an exemplary embodiment of the present invention wherein a removable medium is suitable for storing and loading at least two different software configurations.

Referring now to FIG. 4, an exemplary embodiment of the present invention is shown wherein a removable medium is suitable for storing and loading at least two different software configurations. A user may request a first information handling system including a variety of options, examples of such options are shown in FIGS. 3A, 3B, 3C and 3D. The first requested information handling system 402 may include a first group of hardware configuration components 404 and a first group of software configuration components 406. An additional user may request a second information handling system. The second requested information handling system 408 may include a second group of hardware configuration components 410 and a second group of software configuration components 412. To further complicate the process, at least one of the hardware or software components of the first information handling system is different from at least one of the hardware and/or software components of the second information handling system. Thus, the configuration for the first desired software configuration is different from the configuration of the second desired software configuration, thereby requiring different software configurations. For example, a different hardware component may require a different driver, and the like.

However, by utilizing the present invention, the software configuration corresponding to the first desired software configuration and the software configuration corresponding to the second desired software configuration are stored on a removable medium 414. Thus the removable medium may be utilized to install the first desired software configuration on a first requested information handling system 416 and the second desired software configuration on a second information handling system 418. In this way, multiple copies of the same removable medium may be utilized to install different software configurations on different information handling systems without the requirement of matching only one particular medium with one particular system.

Figure 5:
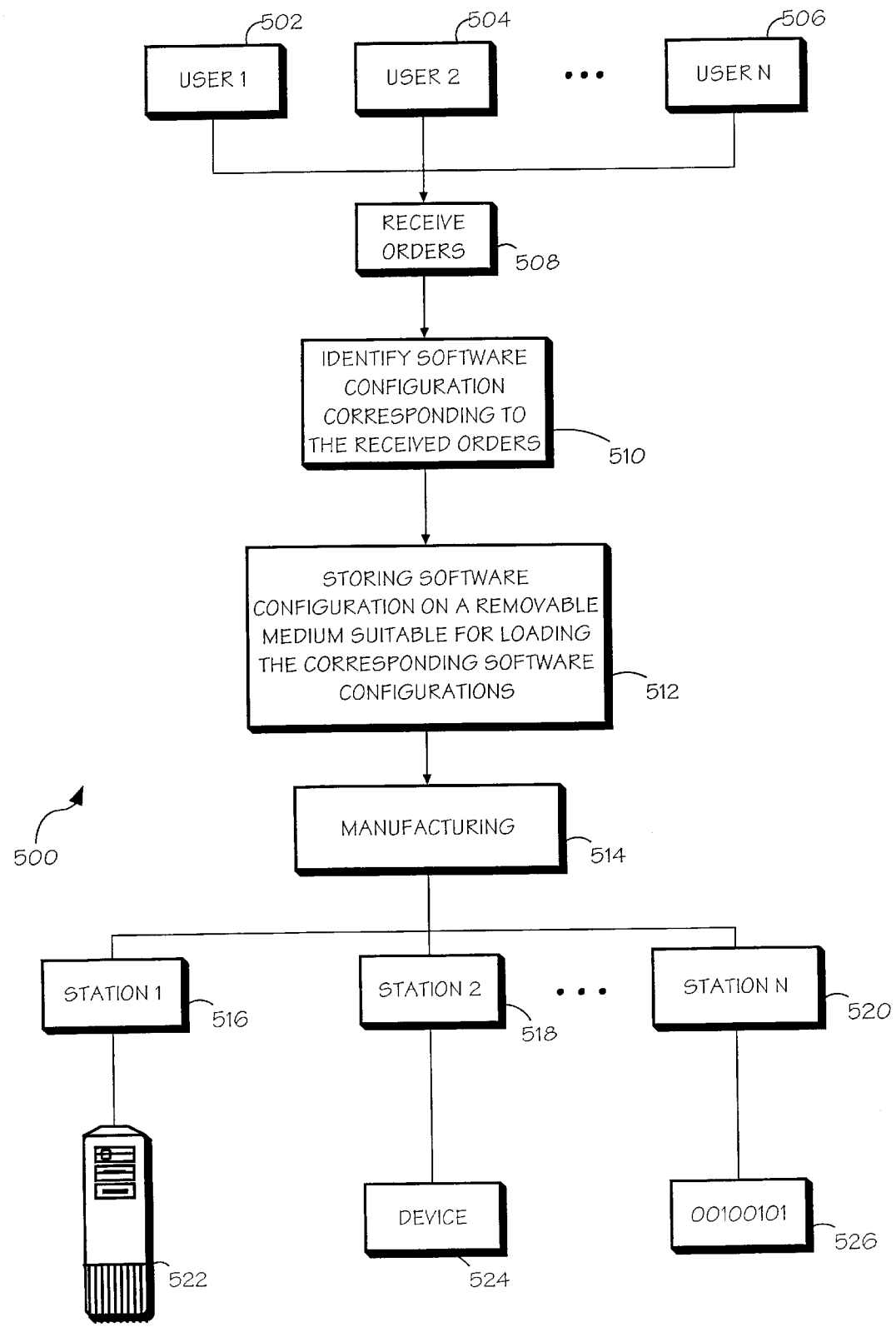
FIG. 5 is a flow diagram of an exemplary embodiment of the present invention wherein a plurality of received orders have a corresponding software configuration identified and stored on a removable medium.

For example, as shown in FIG. 5, an exemplary embodiment 500 of the present invention is shown wherein a plurality of received orders have a corresponding software configuration identified and stored on a removable medium. Orders from a plurality of users 502, 504 and 506 are received 508. Software configurations corresponding to the received orders are identified 510. The corresponding software configurations are then stored on a removable medium, the removable medium suitable for loading the corresponding software configurations 512. Therefore, when the information handling system is manufactured 514 that corresponds to the received order, software 516 corresponding to the particular system 518 and/or device 520 may be input from the removable medium.

By utilizing the present invention, the processing power of the desired information handling system itself may be utilized to configure the software on the information handling system, without requiring the use of network resources. For example, a removable medium, such as a CD-ROM, digital versatile disk (DVD), and the like, may include multiple software configurations. A unique identifier on the information handing system may be used by an executable to load the corresponding information from the CD-ROM without requiring network resources.

Rather than trying to selectively install the specified software configuration from a comprehensive software library located elsewhere on a network, the entire software library may be provided on a removable medium suitable for installation and readable by the system being manufactured. The install media may be programmed over a network in advance, for example, at the end of the day, overnight, or otherwise during off-peak hours. A program may be utilized to read the customer's order and selectively install the ordered components from the removable medium. Thus, only the processing power of the system itself is required for extraction and installation of the software, and the network is not used during manufacture. The comprehensive software collection may be compressed due to size constraints. The install media may be a removable medium, such as a DVD-ROM, CD-ROM, tape, or other removable media that may be utilized by a drive included in the information handling system being manufactured. Since knowledge of a particular order is not required, the install media may be prepared in advance. Thus, multiple software configurations may be loaded on a plurality of information handling systems from a single type of removable medium in a time efficient and cost-effective manner.

Figure 6:
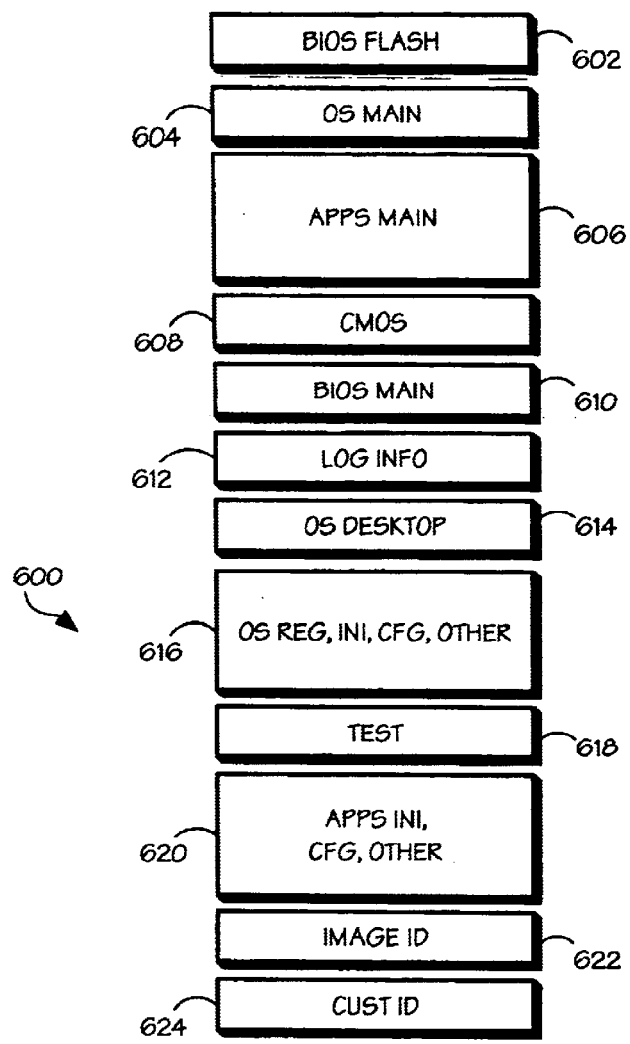
FIG. 6 is an illustration of an exemplary disk image as created by an image builder.

FIG. 6 illustrates an architecture of an exemplary disk image 600 as created by the image builder 20. The image builder 20 builds the image 600 in software according to a desired software configuration and delivers that image to a storage device 30. Sections of the disk image are discussed in the order in which they are presented in FIG. 6. One skilled in the art will readily realize other embodiments of an image architecture are contemplated without departing from the spirit and scope of the present invention.

Section 602 contains BIOS flash properties. The next two sections, sections 604 and 606, contain the main operating system and the main applications' program code or instructions. Hardware characteristics of the computing system receiving the disk image 600 are addressed by section 608 dealing with the CMOS settings, section 610 includes the main BIOS instructions, section 612 supports LOC information and section 614 supports desktop parameters for the main operating system.

Section 616 supports information including, but not limited to the following: operating system registers, initialization information and configurations files. Section 618 includes test information. Similar to section 616, section 620 includes, but is not limited to the following: application system registers, initialization information and configurations files. The last two sections contain an identification of the specific image itself 622, and the last section contains an identification of the customer 624. The identification numbers allow for future reference of the created image, which is helpful for trouble shooting problems in the software configuration and in also adding delta images to the previously delivered image in order to upgrade existing applications.

Figure 7:
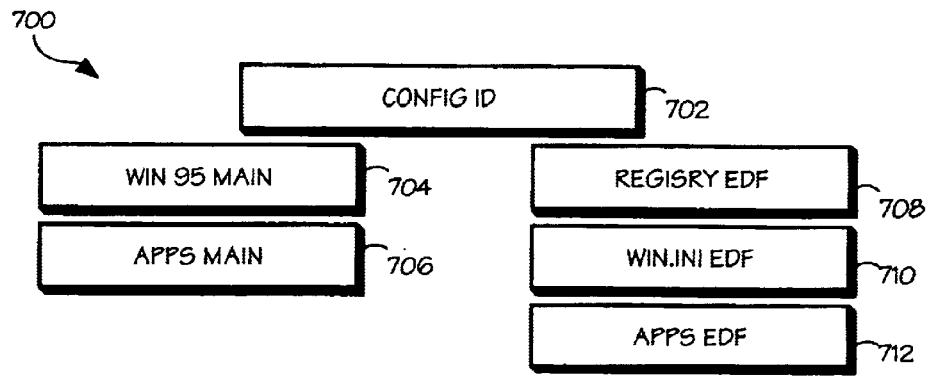
FIG. 7 is an illustration of an exemplary identification scheme of a disk image structure of the present invention.

FIG. 7 illustrates an exemplary embodiment of an identification scheme 700 for a disk image structure. The image identification is a tree structure with a configuration identification number. Also included in the tree structure are underlying identification numbers corresponding to main files and underlying identification numbers corresponding to edited dynamic files (EDF).

More specifically, the identification scheme 700 includes a configuration number 702 identifying what the desired image is built from. It is the foundation from which the image builder 20 works from in creating the desired image. Once the configuration ID 702 is identified, then the main files corresponding to the operating system 704, e.g., Windows, Liniux, and the like, and the desired application 706 are layered on top of the configuration ID 702 basic files. Edited dynamic flies corresponding to registry settings 708, operating system initialization files 710, application EDF files 712.

An image build software delivery process has been described. The process creates an image of a customer's order in software before placing the image on a hard drive or other storage means for the customer. Once an image has been created, changes or deltas to the baseline image can easily be made without having to redefine the baseline. Adding a delta image to the baseline image allows the desired image to be achieved. This method provides levels of granularity wherein incremental changes can be made to a system without having to perform major work by redefining the baseline. This allows for easy upgrades and allows technical support to function efficiently.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the method for configuring software for a build to order system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A computer implemented method of building a custom software configuration, comprising:

receiving a plurality of requests for desired software configurations;

identifying at least one baseline configuration corresponding to the desired software configurations;

comparing the at least one baseline configuration with the desired software configurations;

creating a set of changes based on the comparison wherein the set of changes are suitable for combining with the baseline configuration to generate the desired software configuration, and storing the at least one baseline configuration and set of changes on a removable medium, the removable medium suitable for loading a plurality of desired software configurations corresponding to the requested plurality of desired software configurations.

2. The method as described in claim 1, wherein the plurality of requests for desired software configurations correspond to at least one of a first software component, a second software component, a first hardware component and a second hardware component, wherein at least one of the first hardware component is different from the second hardware component and the first software component is different from the second software component.

3. The method as described in claim 1, wherein the removable medium includes at least one of a compact disk read-only-memory (CD-ROM), digital versatile disc (DVD), PC Card for utilization in a PC slot, floppy disk, floppy/optical disk for use in a floppy/optical drive, zip disk for use in a zip drive, and tape for use in a tape drive.

4. The method as described in claim 1, wherein at least one of the baseline configuration and set of changes are identified through the use of a configuration ID.

5. The method as described in claim 1, wherein the plurality of requests are grouped.

6. A computer implemented method of building a custom software configuration, comprising:

receiving a first request for a first desired software configuration and a second request for a second desired software configuration, the first desired software configuration being different than the second desired software configuration;

identifying at least one software configuration corresponding to at least one of the first desired software configuration and the second desired software configuration, wherein the at least one software configuration is suitable for generating the first desired software configuration and the second desired software configuration, and storing the software configuration on a removable medium, the removable medium suitable for loading the first desired software configuration and the second desired software configuration.

7. The method as described in claim 6, wherein the first request for a first desired software configuration includes least one of a first software component and a first hardware component and the second request for a second desired software configuration includes at least one of a second software component and a second hardware component, wherein at least one of the first hardware component is different from the second hardware component and the first software component is different from the second software component.

8. The method as described in claim 6, wherein the removable medium includes at least one of a compact disk read-only-memory (CD-ROM), digital versatile disc (DVD), PC Card for utilization in a PC slot, floppy disk, floppy/optical disk for use in a floppy/optical drive, zip disk for use in a zip drive, and tape for use in a tape drive.

9. The method as described in claim 1, wherein the software configuration is identified through the use of a configuration ID.

10. The method as described in claim 1, further comprising a third request for a third desired information handling system, and when the first desired information handling system is more similar to the second desired information handling system than the third desired information handling system, the first information handling system and the second information handling system are grouped.

11. A computer implemented method of building a custom software configuration, comprising:

receiving a first request for a first desired software configuration and a second request for a second desired software configuration, the first desired software configuration being different than the second desired software configuration;

identifying at least one baseline configuration corresponding to at least one of the first desired software configuration and the second desired software configuration;

comparing the at least one baseline configuration with the first desired software configuration and the second desired software configuration;

creating a set of changes based on the comparison wherein the set of changes are suitable for combining with the at least one baseline configuration to generate the first desired software configuration and the second desired software configuration, and storing the at least one baseline configuration and set of changes on a removable medium, the removable medium suitable for loading the first desired software configuration and the second desired software configuration.

12. The method as described in claim 11, wherein the first desired software configuration is loaded on a first information handling system and the second desired software configuration is loaded on a second information handling system.

13. The method as described in claim 11, wherein the removable medium includes at least one of a compact disk read-only-memory (CD-ROM), digital versatile disc (DVD), PC Card for utilization in a PC slot, floppy disk, floppy/optical disk for use in a floppy/optical drive, zip disk for use in a zip drive, and tape for use in a tape drive.

14. The method as described in claim 11, wherein the baseline configuration is identified through the use of a configuration ID.

15. The method as described in claim 11, further comprising a third request for a third desired software configuration, and when the first software configuration is more similar to the second software configuration than the third software configuration, the first software configuration and the second software configuration are grouped.

16. A computer implemented method of building a custom software configuration, comprising:

receiving a first customer order for a first information handling system and a second customer order for a second information handling system, the first customer order including a first list of hardware configuration components and a first list of software configuration components and the second customer order including second list of hardware configuration components and a second list of software configuration components, wherein at least one of the first list of hardware configuration components is different from the second list of hardware configuration components and the first list of software configuration components is different from the second list of software configuration components; and storing at least one software configuration on a removable medium, the at least one software configuration suitable for loading at least one of the first list of software configuration components and the second list of software configuration components onto at least one of the first information handling system and the second information handling system.

17. The method as described in claim 16, wherein the removable medium includes at least one of a compact disk read-only-memory (CD-ROM), digital versatile disc (DVD), PC Card for utilization in a PC slot, floppy disk, floppy/optical disk for use in a floppy/optical drive, zip disk for use in a zip drive, and tape for use in a tape drive.

18. The method as described in claim 16, wherein the software configuration is identified through the use of a configuration ID.

19. The method as described in claim 16, further comprising a third request for a third information handling system, and when the first information handling system is more similar to the second information handling system than the third information handling system, the first information handling system and the second information handling system are grouped.

20. The removable medium as described in claim 16, wherein the removable medium includes at least one of a compact disk read-only-memory (CDROM), digital versatile disc (DVD), PC Card for utilization in a PC slot, floppy disk, floppy/optical disk for use in a floppy/optical drive, zip disk for use in a zip drive, and tape for use in a tape drive.

21. A removable medium having machine readable instructions stored thereon for computer implemented execution, comprising:

a software library, including:

a first software configuration corresponding to a first customer order for a first information handling system, the first customer order including a first list of hardware configuration components and a first list of software configuration components, the first software configuration suitable for loading on the first information handling system; and a second software configuration corresponding to a second customer order for a second information handling system, the second customer order including a second list of hardware configuration components and a second list of software configuration components, the second software configuration suitable for loading on the second information handling system;

wherein at least one of the first list of hardware configuration components is different from the second list of hardware configuration components and the first list of software configuration components is different from the second list of software configuration components so that the first software configuration is unsuitable for loading software configuration components on the second information handling system.

22. The removable medium as described in claim 21, wherein at least one of the first software configuration and the second software configuration includes at least one of BIOS settings, CMOS, operating system, drivers, utilities, application software, vendor software, and user-selected software.

23. The removable medium as described in claim 21, wherein the removable medium is suitable for restoring system setting to an information handling system.

\* \* \* \* \*

UNITED STATES PATENT AND TRADEMARK OFFICE
CERTIFICATE OF CORRECTION

PATENT NO.      : 6,775,829 B1
DATED           : August 10, 2004
INVENTOR(S)     : James L. Kroening, Darrin J. Fangman, James Marshall and Richard Peasley It is certified that error appears in the above-identified patent and that said Letters Patent is hereby corrected as shown below:

<u>Title page,</u>
Item [75], Inventor, change "Inventor: James L. Kroening, Dakota Dunes, SD (US)" to
-- Inventors:  James L. Kroening, Dakota Dunes, SD (US)
 Darrin J. Fangman, McCook Lake SD (US)
 James Marshall, Jefferson SD (US)
 Richard Peasley, Elk Point SD (US) --

Signed and Sealed this

Twelfth Day of October, 2004

JON W. DUDAS
*Director of the United States Patent and Trademark Office*